(12) United States Patent
Fidler

(10) Patent No.: US 9,537,729 B2
(45) Date of Patent: *Jan. 3, 2017

(54) NETWORK SWITCHING DEVICE FOR QUANTIFYING AVAILABLE SERVICE-LEVEL CAPACITY OF A NETWORK FOR PROJECTED NETWORK TRAFFIC

(71) Applicant: HEWLETT PACKARD ENTERPRISE DEVELOPMENT LP, Houston, TX (US)

(72) Inventor: Mark W Fidler, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,555

(22) Filed: Apr. 13, 2015

(65) Prior Publication Data
US 2015/0222502 A1    Aug. 6, 2015

Related U.S. Application Data

(63) Continuation of application No. 13/984,547, filed on Aug. 9, 2013, now Pat. No. 9,036,472.

(51) Int. Cl.
*H04L 12/24*    (2006.01)
*H04L 12/26*    (2006.01)

(52) U.S. Cl.
CPC .......... *H04L 41/5038* (2013.01); *H04L 43/50* (2013.01)

(58) Field of Classification Search
CPC ........ H04W 4/26; H04W 24/08; H04W 28/02; H04W 72/085; H04N 21/24; H04N 21/2405; H04N 21/64738; H04M 15/58; H04M 15/61; H04L 12/24; H04L 12/26; H04L 41/5038; H04L 43/00; H04L 43/08; H04L 43/12; H04L 43/50

(Continued)

(56) References Cited

U.S. PATENT DOCUMENTS 6,538,991 B1 *  3/2003  Kodialam ........... H04L 12/5695
                                                370/229
6,711,137 B1 *  3/2004  Klassen ................ H04L 41/142
                                                370/252

(Continued)

FOREIGN PATENT DOCUMENTS

WO    WO-2009118602 A2    10/2009
WO    WO-2009118602 A3    10/2009
WO    WO-2012125160 A1     9/2012

*Primary Examiner* — Tri H Phan
(74) *Attorney, Agent, or Firm* — Brooks, Cameron & Huebsch, PLLC

(57) ABSTRACT

A network switching device (101) for quantifying available service-level capacity of a network (201) for projected network traffic. The network switching device (101) includes at least one input port (110-1*a*), at least one output port (110-6*a*), at least one packet-handling module, and at least one test-packet module. At least one packet-handling module is coupled to an input port (110-1*a*) and an output port (110-6*a*). At least one test-packet module is coupled with at least one network switching-device module. The test-packet module is to affect presence of a test packet in the network (201) for quantifying available service-level capacity of the network (201) for projected network traffic. A packet-injection system and method for quantifying available service-level capacity of the network (201) for projected network traffic are also provided.

14 Claims, 5 Drawing Sheets

(58) Field of Classification Search
USPC ................................ 370/229–253, 241–253,
396–399,370/400–401; 709/223–244
See application file for complete search history.

(56) References Cited

U.S. PATENT DOCUMENTS

| | | | | |
|---|---|---|---|---|
| 7,116,639 | B1* | 10/2006 | Gail, Jr. ................ | H04L 49/90 370/252 |
| 7,426,453 | B2* | 9/2008 | Patel .................... | F24F 11/0086 702/184 |
| 7,610,381 | B2* | 10/2009 | Cherkasova ...... | H04L 29/06027 709/223 |
| 7,894,361 | B1 | 2/2011 | Bhan et al. | |
| 7,978,628 | B2* | 7/2011 | Bugenhagen ....... | H04L 41/5003 370/253 |
| 8,046,767 | B2* | 10/2011 | Rolia .................... | G06Q 10/06 709/223 |
| 8,068,425 | B2* | 11/2011 | Bugenhagen ........... | H04L 47/11 370/235 |
| 8,503,320 | B2* | 8/2013 | Ekelin ................ | H04L 12/2697 370/252 |
| 9,036,472 | B2* | 5/2015 | Fidler ................ | H04L 43/0882 370/230.1 |
| 2002/0080726 | A1* | 6/2002 | Klassen ............. | H04L 12/2697 370/252 |
| 2003/0118029 | A1* | 6/2003 | Maher, III .......... | H04L 41/5022 370/395.21 |
| 2005/0018611 | A1* | 1/2005 | Chan .................... | H04L 41/147 370/241 |
| 2005/0094567 | A1 | 5/2005 | Kannan et al. | |
| 2008/0108345 | A1 | 5/2008 | Calin et al. | |
| 2009/0219812 | A1 | 9/2009 | Dolganow | |
| 2014/0215271 | A1* | 7/2014 | Oh .................... | G06F 11/3668 714/31 |

\* cited by examiner

NETWORK SWITCHING DEVICE FOR QUANTIFYING AVAILABLE SERVICE-LEVEL CAPACITY OF A NETWORK FOR PROJECTED NETWORK TRAFFIC

TECHNICAL FIELD

Examples of the present technology relate generally to communication networks, network switching devices and methods for quantifying available service-level capacity of a communication network for projected network traffic.

BACKGROUND

The burgeoning growth of information transmission creates ever increasing demands on communication networks utilized to transmit such information. In particular, means for transmitting content conveyed by such information reliably to clients attached to such networks has taken on an increasingly more prominent role in satisfying the demands of clients for new content formats.

Scientists engaged in the research and development of high performance communication networks are keenly interested in finding new means for transmitting such content with high reliability at high rates. Thus, research scientists are actively pursuing new approaches for meeting these demands.

DESCRIPTION OF THE DRAWINGS

The accompanying drawings, which are incorporated in and form a part of this specification, illustrate examples of the technology and, together with the description, serve to explain the examples of the technology.

Figure 1A:
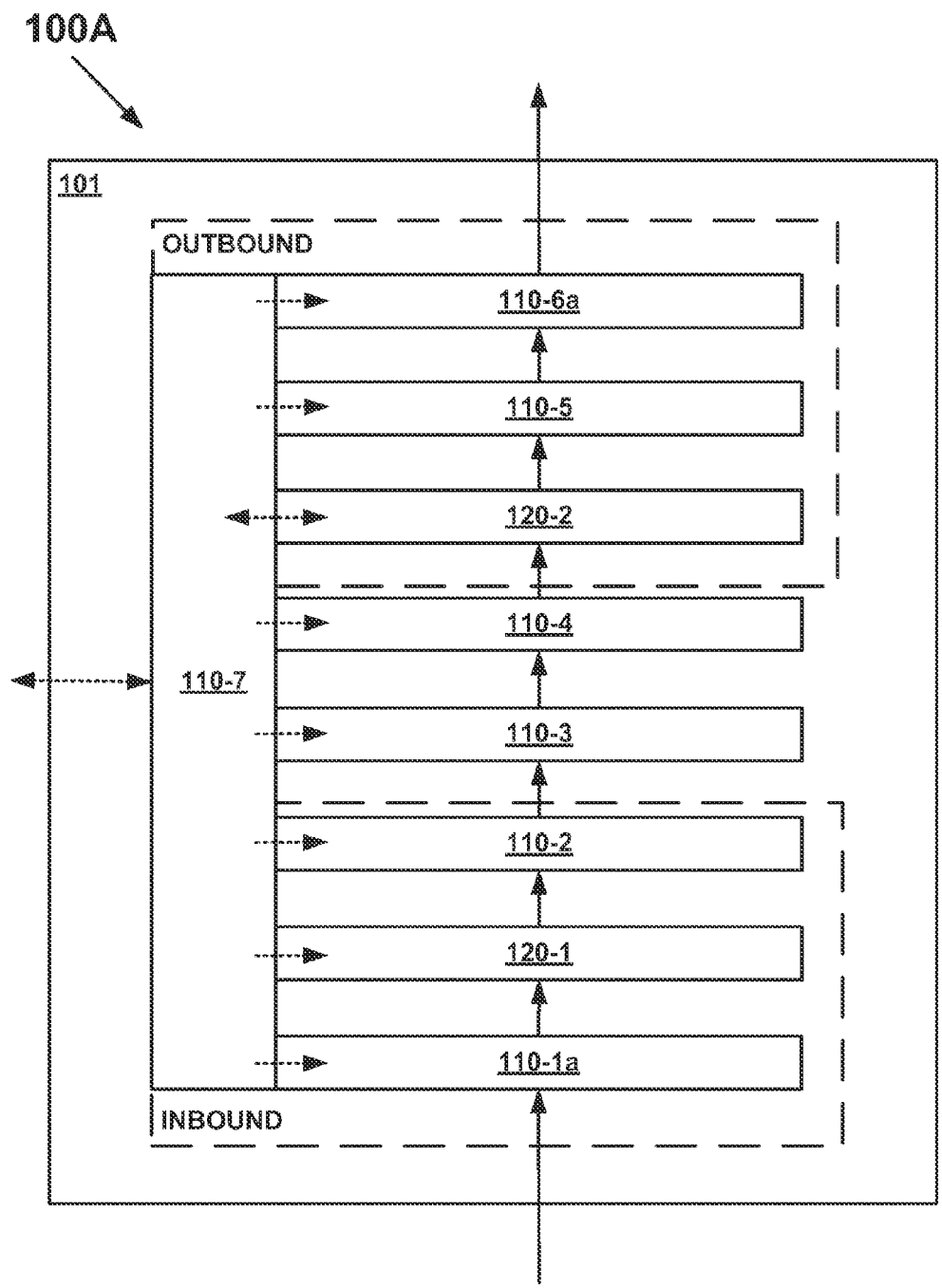
FIG. 1A is block diagram of a network switching device for quantifying available service-level capacity of a network for projected network traffic, in accordance with one or more examples of the present technology.

The drawings referred to in this description should not be understood as being drawn to scale except if specifically noted.

DESCRIPTION OF EXAMPLES

Reference will now be made in detail to the alternative examples of the present technology. While the technology will be described in conjunction with the alternative examples, it will be understood that they are not intended to limit the technology to these examples. On the contrary, the technology is intended to cover alternatives, modifications and equivalents, which may be included within the spirit and scope of the technology as defined by the appended claims.

Furthermore, in the following description of examples of the present technology, numerous specific details are set forth in order to provide a thorough understanding of the present technology. However, it should be noted that examples of the present technology may be practiced without these specific details. In other instances, well known methods, procedures, and components have not been described in detail as not to unnecessarily obscure examples of the present technology. Throughout the drawings, like components are denoted by like reference numerals, and repetitive descriptions are omitted for clarity of explanation if not necessary.

Examples of the present technology include a network switching device for quantifying available service-level capacity of a network for projected network traffic. The network switching device includes at least one input port, at least one output port, at least one packet-handling module, and at least one test-packet module. At least one packet-handling module is coupled to an input port and an output port. At least one test-packet module is coupled with at least one network switching-device module. The test-packet module is to affect presence of a test packet in the network for quantifying available service-level capacity of the network for projected network traffic. Examples of the present technology also include a packet-injection system for quantifying available service-level capacity of the network for projected network traffic, and a method for quantifying available service-level capacity of the network for projected network traffic.

As described herein, certain examples of the present technology may be directed to programming instructions that may be implemented as: hardware; firmware; hardware and software; firmware and software; hardware and firmware; and, hardware, firmware and software; but, not software alone. Moreover, such programming instructions may be incorporated in computer-readable code in a tangible information-storage medium, such as, by way of example without limitation thereto: a hard disk of a hard-disk drive (HDD), a floppy disk of a floppy-disk drive, a compact disk (CD) of a CD read-only memory (ROM), a digital video disk (DVD) of a DVD ROM, as well as the various types of random access memory (RAM) and ROM based on semiconductor integrated circuits (ICs) and other information-storage technologies. Moreover, examples of the present technology including methods are implemented on electronically programmable devices, by way of example without limitation thereto, computers, routers, and switches. Furthermore, examples of the present technology including methods are transformative of the state of a network affecting network traffic in the network, as well as the state of individual devices incorporated within the network, such as, by way of example without limitation thereto, computers, routers, and switches.

Examples of the present technology provide a network tool that may be located in network switching devices, for example, edge switches. The network switching devices may be used to analyze the ability to fully and efficiently support new services, or future services. In addition, the network switching devices may be used to analyze the impact that supporting those services may have on existing network services. When a new client and/or device is authenticated, for example, with a service level granted as part of authentication response, or a potential service is scheduled, examples of the present technology can be used in an incremental fashion to see if service levels of the pending service can be met. Packets, referred to herein as, "test packets," that represent the pending service can be generated at the ports of edge switches in which the service will be sourced and sinked. As used herein, the terms of art, "source," and "sink," when used as verbs, refer to respectively the injection of test packets into, and collection of test packets from, network traffic; and, when used as nouns, refer to a device or module, for injection of test packets into, and for collection of test packets from, network traffic, respectively. In one example of the present technology, the injection of these test packets, which are representative of projected network traffic for new services, or future services, may be done at reduced rate, and may be increased in a graduated manner until the desired service rate is achieved or exceeded. In another example of the present technology, monitors within the network report any side affects that violate rules previously established for the network. In yet another example of the present technology, violations of rules cause the test-packet injection to be reduced, or stopped all together. In other examples of the present technology, profiles and/or templates may be supplied by the network vendor(s), service application providers, generated by a learning process, or defined by network administrators, that represent the characteristic load of various services. These profiles and/or templates may be used to program packet-injection rates for the ability to support the service. Examples of the present technology may be provided as part of a system that is used to implement an Adaptive Service Architecture (ASA) for wired and/or wireless network systems. Examples of services for which examples of the present technology may test a network include: security services, multicast video, unicast video, voice, large numbers of devices such as Smartphones, as well as others presently known in the art, without limitation thereto.

Examples of the present technology provide a component of the ASA that is a piece of the Flex Campus architecture of the HP™ Networking group. ASA is a Network Infrastructure that includes hardware, cabling, network management and network tools. ASA is simple to design, implement and deploy to achieve maximum efficiency for diverse application service delivery through dynamic adaptation based on granular monitoring, active traffic simulation, and intelligent policy configuration. As networks evolve to offer a wider variety of demanding services in different ways and locations throughout the day, ASA allows networks upon which ASA is implemented to be competitive. Thus, network tools such as the packet-injection technology may be a differentiator with respect to alternative technologies. Today, aside from examples of the present technology, to the inventor's knowledge, packet-injection technology does not exist and is not an embedded part of networks. There are network tools for troubleshooting a network, but not as part of a solution to provide more reliable service support on a dynamic basis. Examples of the present technology are expected to be even more valuable in the future as more devices and more services are supported on networks. As an alternative to examples of the present technology, predictive analysis in software through modeling is not expected to be as good as examples of the present technology. Unlike examples of the present technology, predictive analysis in software through modeling could probably not respond to immediate evaluation of a requested service, for example, when a client and/or a device are authenticated on a network. Examples of the present technology could also be used as an inline network trouble-shooting tool on an active network, which modeling by its off-line nature is not equipped to provide.

With reference now to FIG. 1A, in accordance with one or more examples of the present technology, a block diagram 100A is shown of a network switching device 101. The network switching device 101 is for quantifying available service-level capacity of a network, for example, the network 201 shown in FIG. 2, for projected network traffic. The network switching device 101 includes at least one input port 110-1a, at least one output port 110-6a, at least one packet-handling module, and at least one test-packet module. At least one packet-handling module is coupled to an input port 110-1a and an output port 110-6a. At least one test-packet module is coupled with at least one network switching-device module. As used herein, the term of art, "couple," denotes electrically coupling one device or module to another device or module, including intervening devices or modules coupled in between the device or module and the other device or module. Thus, one or more packet-handling modules may be interconnected in series between the input port 110-1a and the output port 110-6a, by way of example without limitation thereto. For example, as shown in FIG. 1A, in one example of the present technology, without limitation thereto, packet-handling modules include: an input buffer 110-2 coupled with the input port 110-1a, a packet-forwarding engine 110-3 coupled to the input buffer 110-2, a packet-processing engine 110-4 coupled to the packet-forwarding engine 110-3, and an output buffer 110-5 coupled with the packet-processing engine 110-4. Moreover, as shown in FIG. 1A, in one example of the present technology, without limitation thereto, network switching-device modules include: the input port 110-1a, the output port 110-6a coupled with the output buffer 110-5, and the packet-handling modules coupled together as described above. The test-packet module is to affect presence of a test packet in the network 201 for quantifying available service-level capacity of the network 201 for projected network traffic. For example, the test-packet module may affect the presence of a test packet in the network 201 by serving as a source or a sink for the test packet. Thus, the test-packet module of the network switching device 101 may be either a test-packet injector 120-1, or a test-packet collector 120-2.

Figure 1B:
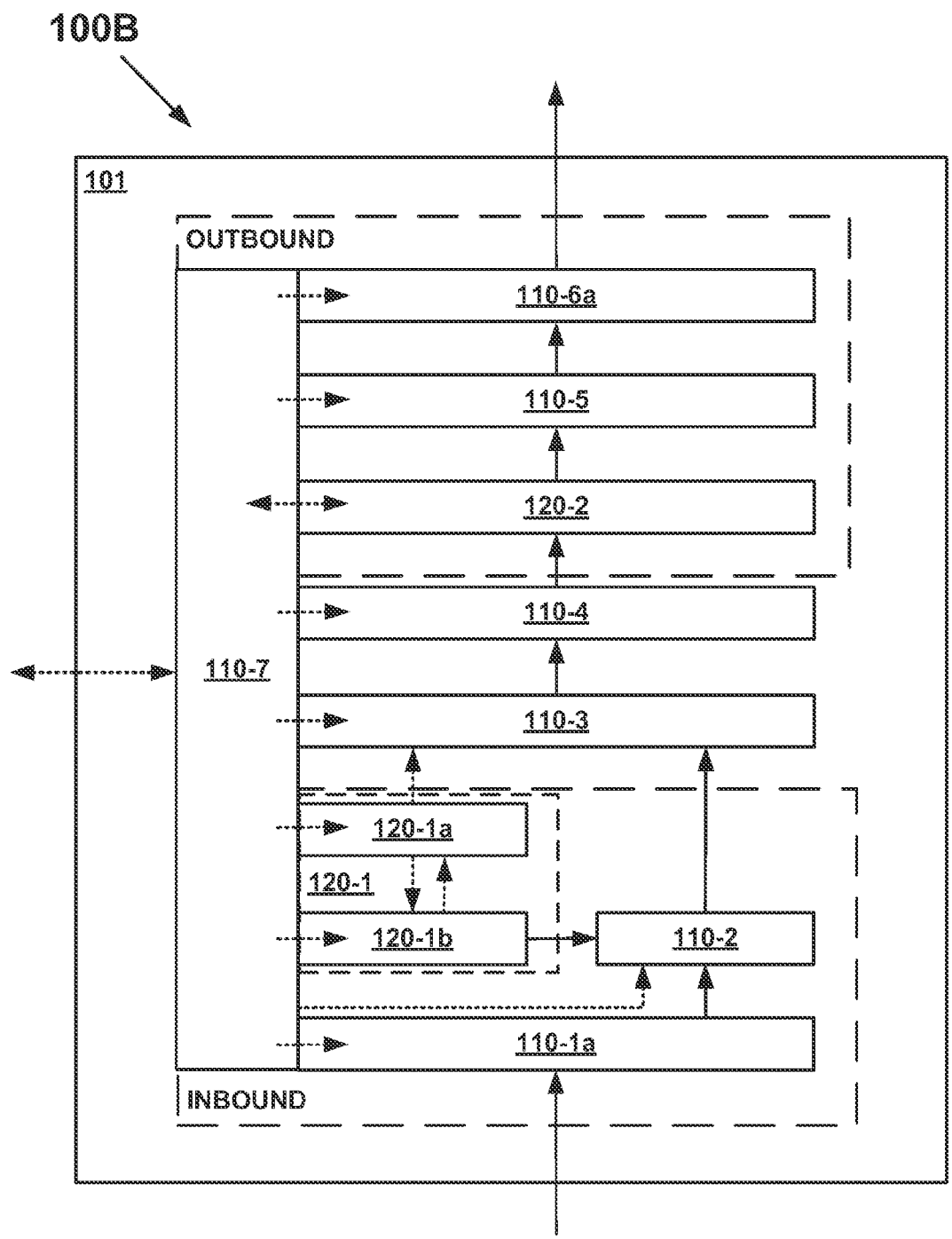
FIG. 1B is block diagram of the network switching device detailing one example configuration for a test-packet injector, for quantifying available service-level capacity of a network for projected network traffic, in accordance with yet other examples of the present technology.
Figure 2:
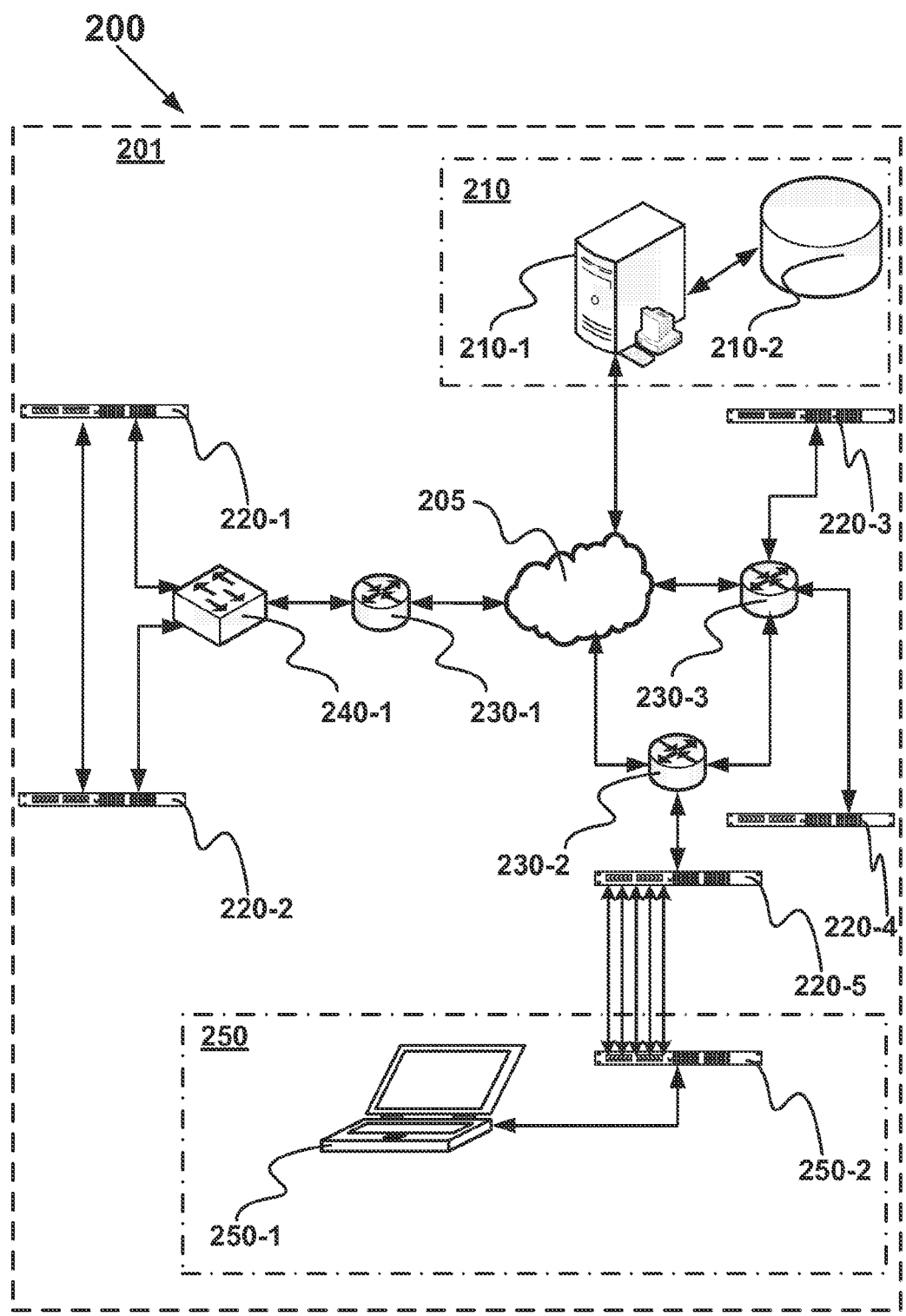
FIG. 2 is a schematic diagram of a network in which the network switching device shown in FIGS. 1A and 1B may be used, in accordance with one or more examples of the present technology.

With further reference to FIG. 1A, in accordance with one or more examples of the present technology, the network switching device 101 includes a packet management interface 110-7 to provide communication between a packet management system in the network 201 and the network switching device 101. As shown in FIGS. 1A and 1B, the dashed arrows indicate the flow of control signals, which may include instructions received by the packet management interface 110-7 from a network service-level manager 210 (see FIG. 2), which are conveyed to various modules of the network switching device 101. Although most of the dashed arrows have heads pointing in a single direction from the packet management interface 110-7 to various modules of the network switching device 101, this is by way of example, as examples of the present technology also include within their scope the flow of information bi-directionally, such that information may flow from various modules of the network switching device 101 to the packet management interface 110-7 and from the packet management interface 110-7 to the network service-level manager 210. The solid arrows indicate the flow of packets through various modules of the network switching device 101. The packet management interface 110-7, as shown in FIG. 1A, can be a dedicated interface with the network service-level manager 210, as shown in FIG. 2, or can communicate with the network service-level manager 210 via available ports on the network switching device 101. In accordance with one example of the present technology, the test-packet module may include at least one test-packet injector 120-1. In accordance with another example of the present technology, the test-packet module may include at least one test-packet collector 120-2, which is to both receive control signals from the packet management interface 110-7 and to send data regarding collected test-packets to the packet management interface 110-7 that is sent back to the network service-level manager 210, which is subsequently described in greater detail. Moreover, the network switching device 101 may include both the test-packet injector 120-1 and the test-packet collector 120-2, as shown in FIG. 1A by way of example without limitation thereto. Furthermore, also included within the spirit and scope of examples of the present technology are: a network switching device 101 that includes more than one test-packet injector, similar to test-packet injector 120-1, coupled with one or more packet-handling modules; a network switching device 101 that includes more than one test-packet collector, similar to test-packet collector 120-2, coupled with one or more packet-handling modules; and, a network switching device 101 that includes more than one test-packet injector, similar to test-packet injector 120-1, as well as more than one test-packet collector, similar to test-packet collector 120-2, coupled with one or more respective packet-handling modules.

With further reference to FIG. 1A, in accordance with one or more examples of the present technology, the network switching device 101 includes an inbound packet-handling module. The inbound packet-handling module includes at least one input port 110-1*a*, the input buffer 110-2, and at least one test-packet injector 120-1. The inbound packet-handling module may also include a plurality of input ports (not shown). As depicted in FIG. 1A, test-packet injector 120-1 may be directly coupled with one input port 110-1*a* and the input buffer 110-2. In accordance with one or more examples of the present technology, the test-packet injector 120-1 is to inject at least one test packet, or a plurality of test packets, into network traffic on the network 201, shown in FIG. 2, to simulate projected network traffic without interrupting client services in the network 201. In accordance with other examples of the present technology, the test-packet injector 120-1 may be coupled with components in the inbound packet-handling module in other ways, as next described.

With reference now to FIG. 1B, in accordance with one or more examples of the present technology, a block diagram 100B is shown of another example network switching device 101 detailing one example configuration for the test-packet injector 120-1. In one or more examples of the present technology, the input buffer 110-2 is coupled with the input port 110-1*a*; and, the packet-forwarding engine 110-3 coupled to the input buffer 110-2. Also, the test-packet injector 120-1 includes a test-packet injection engine 120-1*a* that may be directly coupled with the packet-forwarding engine 110-3, and a test-packet injection buffer 120-1*b* that is coupled with the input buffer 110-2, by way of example without limitation thereto. In response to control commands received by the packet management interface 110-7 from the network service-level manager 210, shown in FIG. 2, the test-packet injection engine 120-1*a* of the test-packet injector 120-1 may inject a test-packet, or a plurality of test packets, into the test-packet injection buffer 120-1*b*. The test-packet injection buffer 120-1*b* may subsequently inject the test-packet, or plurality of test packets, into the input buffer 110-2, which passes the test packet, or plurality of test packets, along in the packet flow of the network switching device 101 indicated by the solid arrows into the network traffic of the network 201 to simulate projected network traffic without interrupting client services in the network 201.

With further reference to FIG. 1A, in accordance with one or more examples of the present technology, the network switching device 101 includes an outbound packet-handling module. The outbound packet-handling module includes at least one output port 110-6*a*, the output buffer 110-5, and at least one test-packet collector 120-2. The outbound packet-handling module may also include a plurality of output ports (not shown). The test-packet module includes at least one test-packet collector 120-2 coupled with the packet-processing engine 110-4. The test-packet collector 120-2 is to remove at least one injected test packet from network traffic before reaching a client, and to provide data quantifying available service-level capacity associated with injection of the injected test packet to simulate projected network traffic on the network 201 to which the network switching device 101 is coupled. In accordance with one or more examples of the present technology, the test-packet collector 120-2 is to provide data on performance of the network 201 based on the injected test packet, which may be sent to the packet management interface 110-7 that is sent back to the network service-level manager 210, shown in FIG. 2. The operation of the network switching device 101 within a network 201 is next described in greater detail.

With reference now to FIG. 2, in accordance with one or more examples of the present technology, a schematic diagram 200 is shown of a network 201 in which the network switching device 101 shown in FIG. 1A, or 1B, may be used. The foregoing examples of the network switching device 101, described above, may be incorporated within the environment of the network 201. As shown in FIG. 2, the network 201 includes a network management system, a plurality of edge switches, for example, edge switches 220-1, 220-2, 220-3, 220-4, and 220-5, a plurality of routers, for example, routers 230-1, 230-2 and 230-3, which are interconnected via the network topology indicated by the arrows joining these various components of the network 201. In addition, the network 201 may also include a node switch 240-1. The network 201 may include any of the following: a wide area network (WAN), a local area network (LAN), a wireless network, combinations of one or more of the WAN, LAN, and wireless networks, as well as other communication networks as are known in the art. As shown in FIG. 2, the network may also include the "cloud" 205, a term of art used to refer to portions of the network having extended complex network topologies, for example, the Internet, without limitation thereto. FIG. 2 is useful in describing a variety of network topologies in which examples of the present technology may be implemented, as next described.

For example, in accordance with one or more examples of the present technology, the packet-injection system includes a network service-level manager 210, and a plurality of network switching devices, for example, selected from the group consisting of a plurality of edge switches, for example, edge switches 220-1, 220-2, 220-3, 220-4, and 220-5, a plurality of routers, for example, routers 230-1, 230-2 and 230-3, and one or more node switches, of which node switch 240-1 is an example. The foregoing examples of the network switching device 101, described above, may be also incorporated within the environment of the packet-injection system. The network service-level manager 210 includes a computer 210-1, and a packet-injection manager implemented on the computer 210-1 to control injected test packets in network traffic on the network 201. The packet injection manager may include: hardware; firmware; hardware and software; firmware and software; hardware and firmware; and, hardware, firmware and software, wherein the software is disposed in a computer-readable medium, such as memory, for example, memory 210-2; but, not software alone. Thus, the network management system may include the network service-level manager 210 and network management software disposed in a computer-readable medium, such as memory 210-2, in which software of the network service-level manager 210 is disposed. For example, in accordance with examples of the present technology, the ASA is an example software environment that may include programming instructions incorporated in computer-readable code in a tangible information-storage medium for the network service-level manager 210, and as such the ASA may be disposed in a computer-readable medium, such as memory 210-2.

In addition, in accordance with examples of the present technology, ASA treats the network infrastructure as a combination of assets that can be configured in many ways. The types of devices and services connected during the day will vary. The network 201 is enabled to be configured dynamically to handle different service levels, while efficiently utilizing network assets. In cases where packet-injection monitors, for example, a network switching device 101 including at least one test-packet collector 120-2, such as edge switches 220-1, 220-2, 220-3, 220-4, and 220-5, routers 230-1, 230-2 and 230-3, and node switch 240-1, indicate issues, for example, diminution in service-level capacity, modification or enhancement to the network 201 may be indicated. Examples of the technology provide a network tool to gradually increase the service-level of existing service levels, or new services, prior to enabling them, to understand if the service can be supported, and what impact increasing the service-level, or adding new services, may have on existing services. The incremental simulation of a service can identify potential problems, and may be used to lock services out, or adjust service loads, on existing services. Examples of the present technology also provide for testing at particular times, or at various times, during the day, as well as at different nodes in the network 201. For example, a data backup running in the background may not be noticed, if the overall bandwidth to the client is reduced by pacing the traffic flow to and from that client. By way of another example, servers used for data backup could have the total stream bandwidth of the network traffic reduced to reduce overall load on the network 201.

In accordance with examples of the present technology, the injection tool, for example, one of the network switching devices including at least one test-packet injector 120-1, such as edge switches 220-1, 220-2, 220-3, 220-4, and 220-5, would be located on the ports of the network 201 and would simulate a client and/or device attached to the port. One or more packet-injection commands might be sent indicating the following: the type of traffic, for example, multicast, broadcast, unicast, or a combination of multicast, broadcast, and unicast; the destination addresses for the traffic; the rate of test-packet injection; the test-packet size; potentially the window size; and, expected latency for responses, which could be either express responses, or implied responses.

In accordance with examples of the present technology, the packet-injection monitors in the network 201 may observe delivered network traffic received at a destination and intermediate nodes for the injected-packet network traffic. Other devices in the network 201 may send alarms to the network service-level manager 210, if any predetermined thresholds, for example, a service-level capacity limit, are hit that would trigger sending of an alarm. If one of these thresholds is hit, a dynamic configuration analysis produces a configuration that would resolve the issue that caused the threshold to be hit. While the analysis is being done, if an alarm is hit the rate of test-packet injection would be reduced. Then, the rate of test-packet injection might be incrementally increased once a new configuration had been created that resolves the issue. By way of example, new configurations could be as simple as turning on unused resources, or reassigning virtual LANs to higher speed ports, or additional ports. A special flag in each injected test packet indicates whether the test packet is to be collected at the outbound port, or transmitted, such that injected test packets are not sent to end-user ports associated with clients on the network 201

Thus, examples of the present technology embrace within their spirit and scope programmable packet-injection mechanisms that accurately depict client network traffic at a network edge port, as well as potentially ports in non-edge devices. In accordance with examples of the present technology, the packet-injection mechanisms are provided as a standard feature of the network ports at which network switching devices, for example, edge switches 220-1, 220-2, 220-3, 220-4, and 220-5, are located allowing dynamic analysis. Moreover, monitors in the network 201 interact with programming instructions incorporated in computer-readable code in a tangible information-storage medium, such as may be implemented on the packet-injection manager to provide messages, if thresholds are hit that could jeopardize the performance of the network 201.

With further reference to FIGS. 1A, 1B and 2, in accordance with one or more examples of the present technology, the plurality of network switching devices includes at least one network switching device 101 including at least one test-packet injector 120-1, and at least one other network switching device, similar to network switching device 101, including at least one test-packet collector 120-2. The test-packet injector 120-1 may include the test-packet injection engine 120-1a, and the test-packet injection buffer 120-1b, as previously described in the discussion of FIG. 1B. The test-packet injector 120-1 is to inject test packets into the network 201 to simulate projected network traffic in response to a packet-injection command received from the packet-injection manager. The test-packet collector 120-2 is to remove an injected test packet from network traffic before reaching a client in response to a packet-removal command received from the packet-injection manager, and to provide data to the network service-level manager quantifying available service-level capacity associated with injection of the injected test packet to simulate projected network traffic on the network 201 to which the network switching device 101 is coupled. In accordance with one or more examples of the present technology, the packet-injection manager, the test-packet injector 120-1 and test-packet collector 120-2 are to quantify available service-level capacity of the network 201 to handle the projected network traffic.

With further reference to FIG. 2, in accordance with one example of the present technology, the packet-injection system may be to test the network 201 by simulating the effect of a unicast of test packets of a certain type, for example, video conferencing, between one network switching device, for example, edge switch 220-1, and another network switching device, for example, edge switch 220-4, by way of example without limitation thereto. In another example of the present technology, the packet-injection system may be to test the network 201 by simulating the effect of a multicast of test packets of a certain type, for example, video streaming, between one network switching device, for example, edge switch 220-1, and other network switching devices, for example, edge switch 220-3 and edge switch 220-4, by way of example without limitation thereto. Moreover, in another example of the present technology, the packet-injection system may be to test the network 201 by simulating the effect of a broadcast of test packets of a certain type, for example, audio streaming, between one network switching device, for example, edge switch 220-1, and all the other remaining network switching devices, for example, edge switches 220-2, 220-3, 220-4, and 220-5, by way of example without limitation thereto. Thus, although, by way of example, the network 201 is shown as including the plurality of edge switches 220-1, 220-2, 220-3, 220-4, and 220-5, the plurality of routers 230-1, 230-2 and 230-3, and the node switch 240-1, the packet injection system may include complex topologies of network switching devices serving as test packet sources and network switching devices serving as test packet sinks inter-coupled with one another, being within the spirit and scope of examples of the present technology. Also, within the spirit and scope of examples of the technology is the simultaneous generation of test-packets to simulate multiple flows from various sources in the network 201. Thus, in accordance with examples of the present technology, multiple tests may be performed simultaneously on the network 201.

With further reference to FIG. 2, in accordance with one or more examples of the present technology, the network service-level manager 210 may also include a data analyzer for determining network performance parameters based on data provided from at least one test-packet collector 120-2 of at least one network switching device 101. Moreover, the network service-level manager 210 may be to interact with an external agent through a graphical user interface (GUI). The packet-injection system may also include at least one intermediate node, for example, one of the plurality of routers 230-1, 230-2 and 230-3, or the node switch 240-1, that is to monitor an effect of at least one injected test packet on available service-level capacity of the network 201.

With further reference to FIGS. 1A, 1B and 2, in accordance with one or more examples of the present technology, the test-packet injector 120-1 may be to simulate the projected network traffic generated on a single input port 110-1a to the network switching device 101 of the network 201. In one example of the present technology, the test-packet injector 120-1 may incrementally increase a rate of test-packet transmission on the network to simulate increases in the projected network traffic. In another example of the present technology, the test-packet injector 120-1 is remotely configurable to inject at least one test packet into the network traffic. In yet another example of the present technology, the test-packet injector 120-1 may be used to simulate the projected network traffic generated on a plurality−1 of input ports to the network switching device 101. The packet-injection system may also include a network switching device 101 including a test vehicle 250. The test vehicle 250 may include an edge switch 250-2 that includes at least one test-packet injector to simulate the projected network traffic generated on a plurality of output ports from the edge switch 250-2 coupled to a plurality input ports to a network edge switch 220-5, simulating projected network traffic input to the network edge switch 220-5. Thus, the test vehicle can simulate the network traffic generated by a sub-network coupled to the input ports of the network edge switch 220-5, for example, as might be generated by the output from a data center coupled to the input ports of the network edge switch 220-5. The test vehicle 250 may also include a computer interface 250-1 to program the simulation of the projected network traffic generated on the plurality of input ports to the edge switch 220-5. A network switching device 101, which may be incorporated in the packet-injection system, may also include a device selected from the group consisting of a network switch, for example, one of the plurality of edge switches 220-1, 220-2, 220-3, 220-4, and 220-5, or the node switch 240-1, and a network router, for example, one of the plurality of routers 230-1, 230-2 and 230-3.

Figure 3:
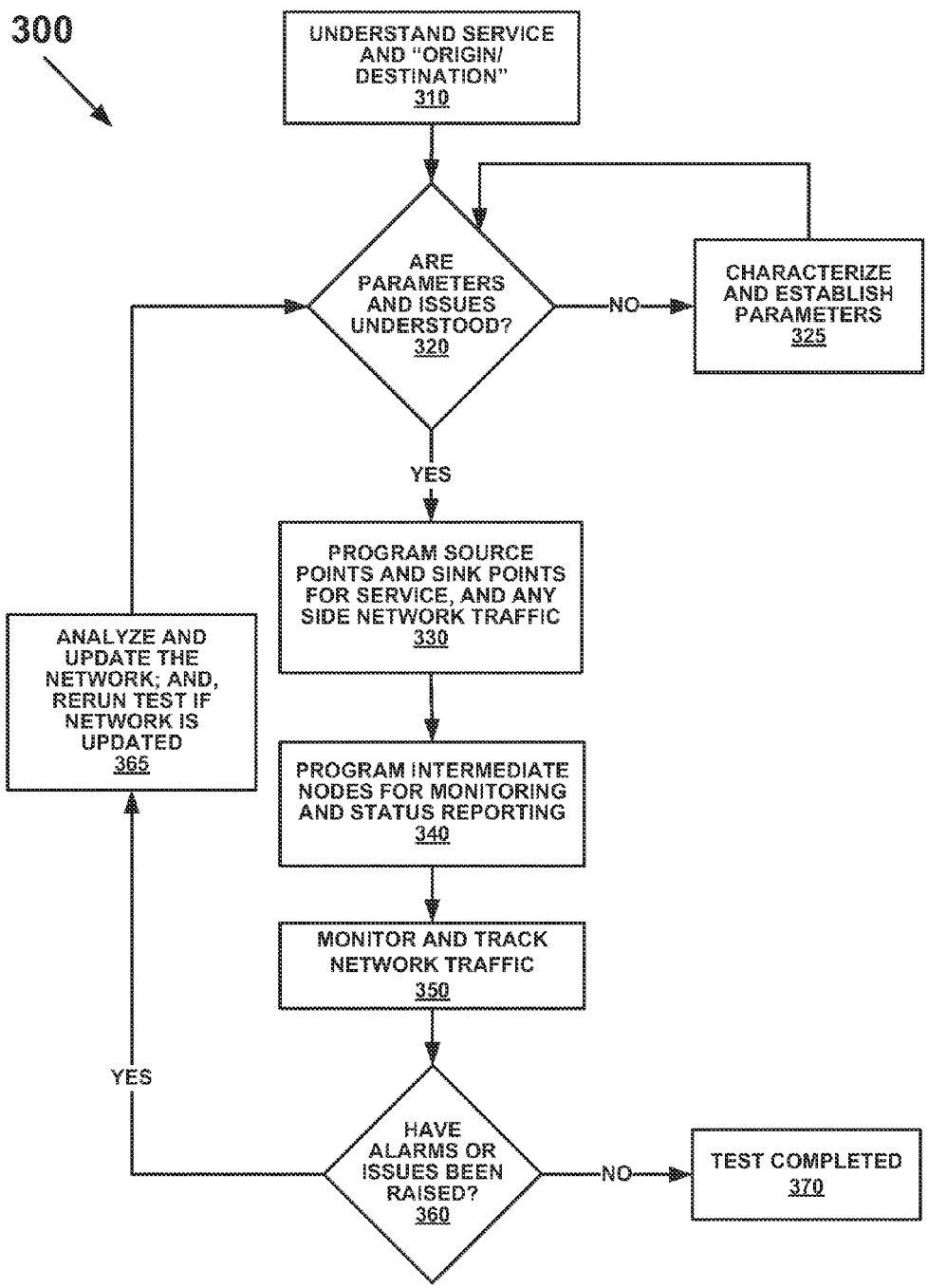
FIG. 3 is a flowchart of one example method for quantifying available service-level capacity of a network, for example, the network shown in FIG. 2, for projected network traffic, in accordance with an example of the present technology.

With reference now to FIG. 3, in accordance with an example of the present technology, a flowchart 300 is shown of one example method for quantifying available service-level capacity of a network, for example, the network shown in FIG. 2, for projected network traffic. The example method includes the following operations. At 310, understanding is obtained of new services that may be utilized by an existing or future client on the network. In addition, information is obtained concerning the origin of new content that may be requested by the client, as well as the destination on the network corresponding to receipt of the new content by the client. At 320, the parameters and issues associated with such new services are reviewed for whether such parameters and issues have been properly understood. If such parameters and issues have not been thoroughly understood, at 325, such parameters and issues are properly established. For example, the parameters that will be programmed into the network switching device are: the type of test packet to inject; the rate at which test packets are injected into network traffic; the incremental rate at which to adjust the test-packet rate; the length in bits of the injected test packet; the source and client addresses, for example, media access control (MAC), Internet protocol (IP), etc.; whether the network traffic simulated by the injection of test packets is in the form of a unicast, a multicast, or a broadcast; any quality of service (QoS) parameters: and, security parameters, such as encryption, tunneling, as well as other security parameters. Moreover, the example method may also program other ports to send general traffic, which is not associated with the general service to represent other network loads that may be present. If such parameters and issues have been thoroughly understood, at 330, the sources for test-packet injection and sinks for test-packet collection are programmed by the network service-level manager through the management interfaces on the corresponding network switching devices. In addition, any side traffic is also programmed to the management interfaces of corresponding network switching on the network. At 340, intermediate nodes are programmed through the network service-level manager to monitor network traffic and to report the status of available service-level capacity of the network back to the network service-level manager. At 350, network traffic is monitored and tracked on the network. At 360, the network service-level manager checks to see if any alarms or issues have been raised by the injection of test packets into the network. If any alarms or issues arise, then analysis is needed to understand the severity and whether physical updates or configuration changes will be made to the network or if changes in the parameters of the test will be made. If changes are made the same test or a modified test can be used to evaluate the network. At 370, if no alarms or issues have been raised the test of the network is completed. On the other hand, at 365, if alarms or issues have been raised in analysis and update of the network is undertaken, a rerun of the test is performed beginning at operation 320 after the network parameters have been updated.

Figure 4:
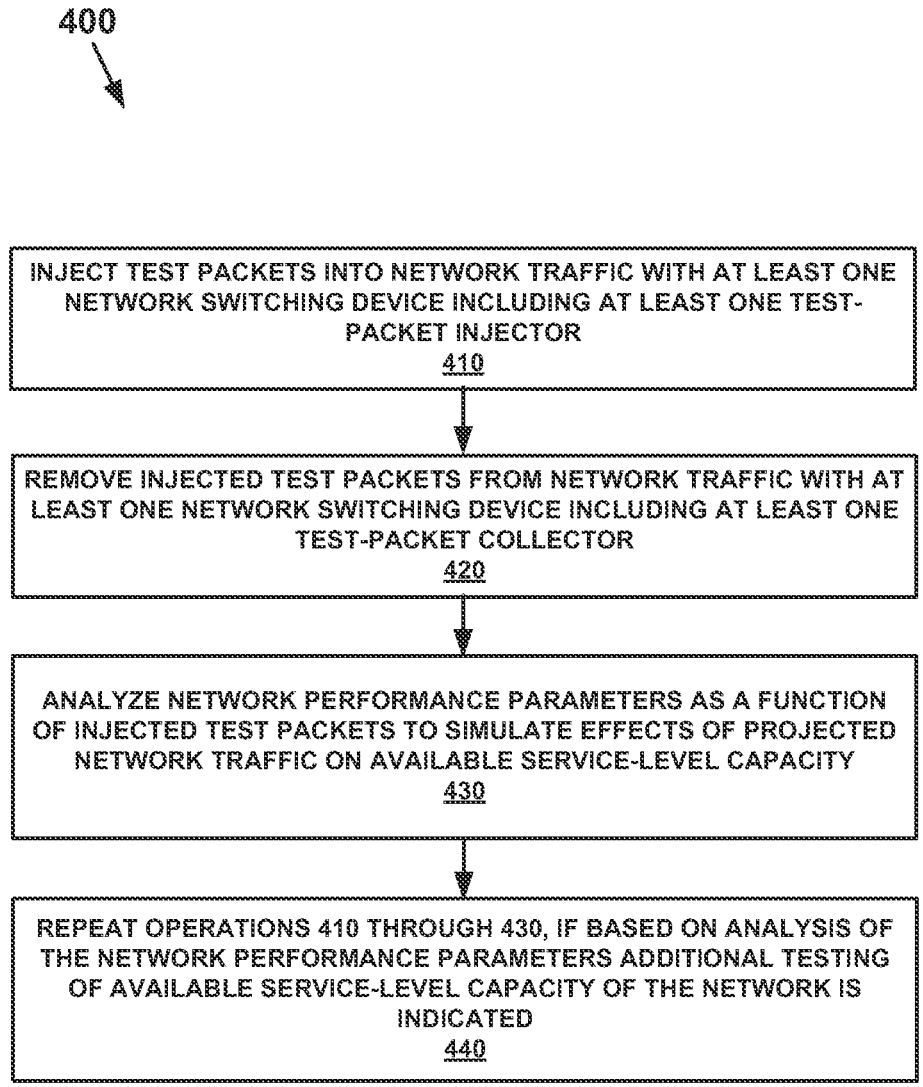
FIG. 4 is a flowchart of a method for quantifying available service-level capacity of a network, for example, the network shown in FIG. 2, for projected network traffic, in accordance with another example of the present technology.

With reference now to FIG. 4, in accordance with another example of the present technology, a flowchart 400 is shown of the method for quantifying available service-level capacity of a network, for example, the network shown in FIG. 2, for projected network traffic. The method includes the following operations. At 410, injected test packets are injected into network traffic with at least one network switching device that includes at least one test-packet injector. In connection with injecting the injected test-packets, at least one source, for example, a network switching device that includes at least one test-packet injector, is selected for injecting packets into network traffic. At 420, injected test packets are removed from network traffic with at least one network switching device that includes at least one test-packet collector. In connection with removing the injected test-packets, at least one sink, for example, a network switching device that includes at least one test-packet collector, is selected for removing injected test packets from network traffic. At 430, network performance parameters are analyzed as a function of injected test packets to simulate effects of projected network traffic on available service-level capacity. By way of example, network performance parameters may include available service-level capacity, without limitation thereto. The method may further include an operation to select parameters for testing the network to analyze network performance parameters of the network. At 440, operations 410 through 430 may be repeated to provide additional testing of available service-level capacity of the network, if based on analysis of the network performance parameters additional testing of available service-level capacity of the network is indicated. For example, if the service-level capacity of the network has not yet reached a designated level, for example, a threshold as described above, operations 410 through 430 may be repeated to provide additional testing of available service-level capacity of the network.

The foregoing specific examples of the present technology are expected to reduce cost of operation of a dynamic network, to maximize utilization of network resources, and to increase reliability of the network, because new services are tested prior to enablement. In addition, the foregoing specific examples of the present technology are expected to increase understanding of the capability of the network to support new services without having to deploy the new services, to reduce test equipment that otherwise might be utilized to test the network for service-level capacity, and to allow testing of the network prior to power down of devices so that only designated equipment is at full power operation. Moreover, the foregoing specific examples of the present technology are expected to increase understanding of the impact of maintenance so that equipment can be brought down at lower traffic loads, to increase understanding of learned network-traffic loads that can be simulated, and to increase the ability to justify enhancements and changes to the network.

The foregoing descriptions of specific examples of the present technology have been presented for purposes of illustration and description. Examples of the present technology are not intended to be exhaustive or to limit the technology to the precise forms disclosed, and many modifications and variations are possible in light of the above teaching. The examples described herein were chosen and described in order to best explain the principles of the technology and its practical application, to thereby enable others skilled in the art to best utilize the technology and various examples with various modifications as are suited to the particular use contemplated. It may be intended that the scope of the technology be defined by the claims appended hereto and their equivalents.

What is claimed is:

1. A network switching device for quantifying available service-level capacity of a network for projected network traffic, said network switching device comprising:
   an input port and an output port;
   a packet-handling module coupled to said input port and said output port; and
   a test-packet module to affect presence of a test packet in said network for determining available service-level capacity of said network, wherein
   said test-packet module is either a test-packet injector or a test-packet collector.

2. The network switching device of claim 1, said test-packet module coupled to a network switching-device module, said network switching-device module comprising either an input port, an output port, or a packet-handling module; and
   said packet-handling module comprising either an input buffer, a packet-forwarding module, a packet-processing engine, or an output buffer.

3. The network switching device of claim 2, wherein an input buffer is coupled with an input port, and a packet-forwarding engine is coupled to an input buffer; and
   wherein said test-packet module comprises a test-packet injector, comprising a test-packet injection engine coupled with said packet-forwarding engine, and a test-packet injection buffer coupled with said input buffer;
   wherein said test-packet injector is to inject at least one test packet into network traffic on said network to simulate projected network traffic without interrupting client services in said network.

4. The network switching device of claim 3, wherein said test-packet injector is to simulate said projected network traffic generated on at least one input port to said network switching device.

5. The network switching device of claim 3, wherein said test-packet injector is to incrementally increase a rate of test-packet transmission on said network to simulate increases in said projected network traffic.

6. The network switching device of claim 3, wherein said test-packet injector is remotely configurable to inject at least one test packet into said network traffic.

7. The network switching device of claim 2, wherein a test-packet module comprises a test-packet collector coupled with a packet-processing engine;
   wherein said test-packet collector is to remove at least one injected test packet from network traffic before reaching a client, and to provide data quantifying available service-level capacity associated with injection of said test packet to simulate projected network traffic on said network to which said network switching device is coupled; and
   wherein said test-packet collector is to provide data on performance of said network based on said injected test packet.

8. The network switching device of claim 1, further comprising:

a test vehicle comprising at least one test-packet injector to simulate said projected network traffic generated on a plurality of output ports from said network switching device.

9. The network switching device of claim 1, wherein the network switching device is a device selected from the group consisting of a network switch and a network router.

10. A packet-injection system for quantifying available service-level capacity of a network, said packet-injection system comprising:
   a computer; and
   a network service-level manager implemented on said computer, said network service-level manager comprising a packet-injection manager to control injected test packets in network traffic on a network;
   said network including a plurality of switching devices, wherein:
   at least one switching device comprises a test-packet injector to inject test packets into said network to simulate projected network traffic in response to a packet-injection command received from said packet-injection manager; and
   at least one switching device comprises a test-packet collector to remove an injected test packet from network traffic before reaching a client in response to a packet-removal command received from said packet-injection manager, and to provide data to said network service-level manager quantifying available service-level capacity associated with injection of said test packet to simulate projected network traffic on said network.

11. The packet-injection system of claim 10, said network including an intermediate node to monitor an effect of an injected test packet on available service-level capacity of said network.

12. A non-transitory computer-readable storage medium comprising instructions that, when executed by a processer, cause said processor to:
   inject test packets into network traffic via a test-packet injector;
   remove injected test packets from network traffic via a test-packet collector; and
   analyze network performance parameters as a function of injected test packets to simulate effects of projected network traffic on available service-level capacity.

13. The medium of claim 12, further comprising instructions to:
   select at least one source for injecting test packets into network traffic, and at least one sink for removing injected test packets from network traffic; and
   select parameters for testing said network to analyze network performance parameters of said network.

14. The medium of claim 12, further comprising instructions to:
   repeat the injection, removal, and analysis operations if based on analysis of said network performance parameters additional testing of available service-level capacity of said network is indicated.

* * * * *